United States Patent [19]

Blass

[11] Patent Number: 4,766,513

[45] Date of Patent: Aug. 23, 1988

[54] HIGH VOLTAGE APPARATUS

[75] Inventor: Bernardo Blass, Aarau, Switzerland

[73] Assignee: BBC Brown, Boveri AG, Switzerland

[21] Appl. No.: 38,617

[22] Filed: Apr. 15, 1987

[30] Foreign Application Priority Data

Apr. 22, 1986 [CH] Switzerland ........................ 1627/86

[51] Int. Cl.[4] ............................................. H02H 9/04

[52] U.S. Cl. .................................... 361/117; 361/124; 361/127

[58] Field of Search ................................ 361/123–127, 361/117, 120; 337/34, 28; 338/21; 200/148 B

[56] References Cited

U.S. PATENT DOCUMENTS 3,891,897 6/1975 Jakszt ............................ 361/123 X

FOREIGN PATENT DOCUMENTS 1538279 7/1969 Fed. Rep. of Germany .

2247997 6/1974 Fed. Rep. of Germany .

3032852 11/1981 Fed. Rep. of Germany .

1083228 9/1952 France .

2299752 8/1976 France .

*Primary Examiner*—Roy N. Envall, Jr.

*Assistant Examiner*—Todd E. DeBoer

*Attorney, Agent, or Firm*—Ostrolenk, Faber, Gerb & Soffen

[57] ABSTRACT

A high-voltage apparatus having a casing (1) filled with an insulating medium, an active part (6) connected to high voltage in the casing, and a pressure-relief valve (2) closing off the casing (1). The pressure-relief valve (2) includes a hinged cover (9) and a bending spring (12) acting on the cover (9). The pressure-relief valve (2) responds extremely quickly to changes in pressure of the insulating medium located in the casing (1). This is achieved partially by the fact that the bending spring (12) lies in the current path of the active part (6) connected to the high voltage and due to the fact that the bending spring (12) is formed with weakened regions which are heated faster by the current. As a result, the rigidity of this bending spring (12) suddenly drops as the current exceeds a predetermined value. This results in sudden relieving of the pressure in casing (1).

12 Claims, 1 Drawing Sheet

HIGH VOLTAGE APPARATUS

BACKGROUND OF THE INVENTION

The invention relates to a high-voltage apparatus and, more particularly, to a high-voltage apparatus having a gas filled casing and a pressure relief valve.

High-voltage apparatuses of the type referred to here described for instance in DE-A1-3,0 32,852. Such high-voltage apparatuses designed as lightning arresters have a casing filled with insulating gas, in which an active part connected to high voltage and consisting of a stack of nonlinear metal oxide resistors is accommodated. The casing is closed off from the outside by means of a pressure-relief valves, which responds above a limit value of the insulating gas in the casing. This known pressure-relief valve has a hinged cover and a bending spring bearing against this cover and is relatively slow-acting.

SUMMARY OF THE INVENTION

The invention has as its object specifying a high-voltage apparatus of the type mentioned above in which reliable pressure relief is ensured even in the case of rapid changes in pressure.

The high-voltage apparatus according to the invention is characterized in particular in that undesirable pressure surges can be reduced without the casing being subjected to impermissible loads.

BRIEF DESCRIPTION OF THE DRAWINGS

The invention is illustrated below with reference to the drawing, in which.

DETAILED DESCRIPTION OF THE DRAWINGS

Figure 2:
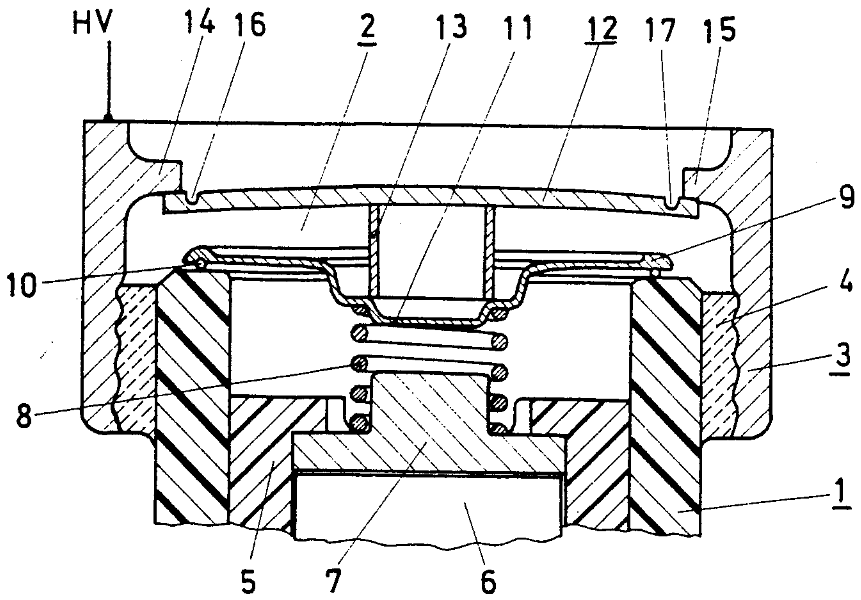
FIG. 2 shows a plan view of a section along II—II through the lightning arrester according to FIG. 1.
Figure 1:
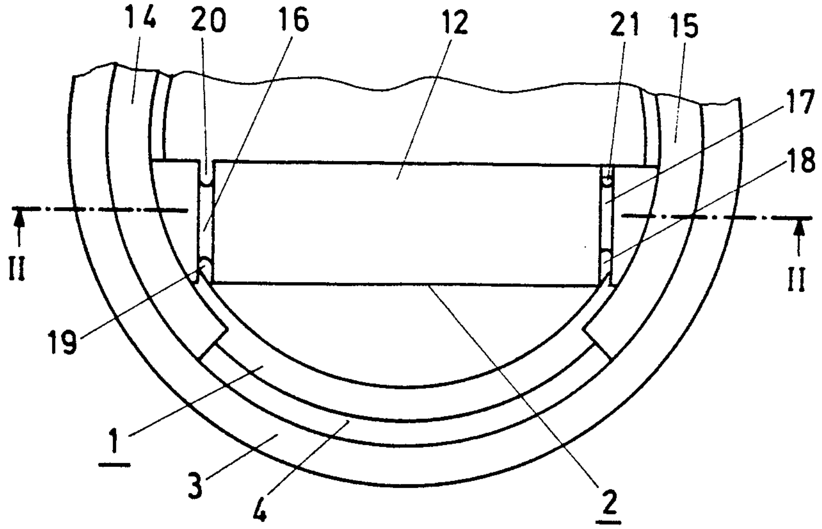
FIG. 1 is a plan view of an embodiment of the high-voltage apparatus according to the invention designed as a lightning arrester.

The lightning arrester illustrated in FIGS. 1 and 2 has a cylindrical casing 1 filled with an insulating medium, such as air, sulfur hexafluoride or insulating oil, as well as a pressure-relief valve 2 closing off the casing from the outside in a gas-tight manner. The casing 1 may be made of metal, but may also be formed—as shown—of insulating material, such as porcelain or cast resin. The casing 1 is bounded at its end faces by two flanges of electrically conductive material, fastened to the outside of the casing 1 by means of a plastic compound 4, of which the flange 3 illustrated in the figures is at high-voltage potential H.V., while the flange not shown is at ground potential or at a potential other than high-voltage potential H.V.

Inside casing 1 there is an active part 6 held by an insulating part 5 and consisting for instance of a stack of nonlinear metal oxide resistors. The active part 6 is connected electrically to the pressure-relief valve 2 via a contact element 7 and a flexible copper connection (not shown) and is at high voltage H.V. at its upper end. Its lower end (not shown) is connected via a contact element (not shown) and the lower flange (not shown) of the casing 1 to ground or to a potential other than high-voltage potential H.V. The individual resistors of the active part 6 contact one another by a force induced by a compression spring 8.

The pressure-relief valve 2 includes a cylindrical cover 9 of electrically conductive material which is as lightweight as possible, such as aluminum, titanium or an alloy containing aluminum, titanium and/or vanadium. The rim of cover 9 bears a sealing ring 10, which rests on the upper face of the casing 1, providing a sealing surface. The cover 9 also has an eccentrically arranged impression 11, which stabilizes its rim, is directed toward the interior of the casing 1 and in whose outer cavity a sleeve 13 of electrically conductive material is mounted, acted upon by a bending spring 12 of electrically conductive material, such as electrically conductive spring steel. The compression spring 8 is mounted with its upper end bearing against the inwardly directed curvature formed by the impression 11. The lower end of the compression spring 8 is held by a projection of the contact element 7.

The bending spring 12 is designed as a beam and its two ends bear against two bearing points 14 and 15 attached to the flange 3. Between the two bearing points 14 and 15, the bending spring 12 has two material recesses, one of which is arranged in the region of the bearing point 14 and the other is arranged in the region of the bearing point 15. These material recesses may in each case be formed by a groove 16 and 17, respectively, extending transversely to the longitudinal axis of the beam and transversely to the bending direction of the bending spring 12, and may be provided on the upper and/or lower side of the bending spring 12. It is also conceivable that each material recess is formed in each case by two grooves provided in each case on the upper and lower sides of the bending spring 12. As can be seen from the right-hand part of FIG. 1, in addition to the groove 17, there may also be a groove 18 taken transversely to the longitudinal axis of the beam, which groove is substantially taken in the bending direction of the bending spring 12, i.e., transversely to the groove 17. As illustrated in the left-hand of FIG. 1, alternatively two grooves 19, 20 may also be provided, located on the front and rear of the bending spring 12 and taken substantially in the bending direction of the bending spring 12. It is also possible for the material recesses to be formed merely by vertical grooves, such as the groove 18, 19 and/or 20. Furthermore, the grooves may merely extend partially transversely to the bending spring, without reaching their opposite sides. It is also conceivable for the material recesses to be designed as through-holes or blind holes 21. The above mentioned "material recesses" form weakened regions in the bending spring 12.

The lightning arrester described above acts as follows: under normal operating conditions, ends of bending spring 12 bear on the bearing points 14 and 15 and exert a force on the cover 9 via the sleeve 13 arranged in its center. A counter-force is exerted on the cover 9 by the compression spring 8 supported by the contact element 7 and acting on the resistors of the active part 6 with contact force, this counter-force being substantially smaller however than the force which can be generated by the bending spring 12. The force of the bending spring 12 is dimensioned such that the cover 9 closes off the casing 1 filled with insulating medium in a gas-light manner.

In this arrangement, the bending spring 12 may be stressed just as much as a bending spring without material recesses in the edge zone, since, in a bending spring freely mounted at both ends, the smallest bending stress occurs in the edge zone and the greatest bending stress in the region of the force acting. At the same time, the part of the active part 6 adjacent to the contact element 7 is at high-voltage potential via the contact element 7, the flexible copper connection (not shown), the cover 9, the sleeve 13, the bending spring 12 and the bearing points 14 and 15 of the flange 3. Under normal operating conditions, a small operating current, of at most a few milliamperes, flows through the active part 6 of the arrester to the, for example grounded, flange (not shown) of the casing 1.

If, under certain conditions, as under the occurrence of unexpectedly high overvoltages or a defect in one or more of the resistors of the active part, an undesirable arc develops inside the casing 1, this arc generates a pressure surge acting on the inside wall of the casing 1. The current feeding the arc is supplied to the arc of high voltage H.V. via the bending spring 12. When this happens, the parts of the bending spring 12 located in the region of the bearing points 14 and 15 and having a small current-carrying cross-section owing to the grooves 16, 17, 18, 19 and/or 20 and the bore holes or blind holes 21, if any, heat up (for instance owing to the skin effects) considerably more quickly than the remaining parts of the bending spring 12. This considerably reduces the rigidity of the bending spring 12 in the region of the material recesses above a limit value of the current feeding the undesirable arc. If a pressure surge induced by the arc then develops in the casing, the pressure-relief valve 2 responds extremely quickly to this pressure surge, owing to the relatively low inertia of its cover 9 and to the low rigidity of the spring at this time, and opens.

The opening process is further accelerated by the fact that the bending spring 12 is arranged eccentrically with respect to the circular cover 9. Excentric arrangement causes the bending spring 12 to be subjected not only to bending but also to torsion. Since the spring rigidity is substantially reduced, both with regard to a bending oscillation and also with regard to a torsional oscillation, when the pressure surge occurs, the cover 9 can therefore at the same time pivot very quickly and the interior of the casing 1 be relieved of pressure in a specified desired direction.

The high-voltage apparatus according to the invention does not necessarily have to be a lightning arrester. It is possible for example for it to be designed as a high-voltage switch, whose casing, designed for instance as porcelain or plastic insulator, is to be protected against undesirably high pressure surges.

I claim:

1. A high-voltage apparatus, comprising:

a casing filled with insulating medium and at least one active part disposed in said casing;

a pressure-relief valve mounted to normally retain insulating medium within said casing, said pressure-relief valve including a cover mounted to an opening of said casing and at least one bending spring acting on the cover to bias said cover against said casing, said at least one bending spring being constituted of a beam which is supported at opposed ends thereof; and at least one recess defined in the beam in the region where each beam is supported and forming a weakened region therein, said bending spring being electrically coupled to said at least one part and enabling current flow through said at least one active part to flow through said at least one bending spring whereby the rigidity of said at least one bending spring suddenly drops when the current flowing through said at least one active part exceeds a predetermined value.

2. A high-voltage apparatus according to claim 1, wherein said at least one recess includes at least a first groove (16, 17) which extends transversely to a longitudinal axis associated with said beam.

3. High-voltage apparatus according to claim 2, said cover comprising a circular cover (9), wherein the bending spring (12) acts eccentrically on the cover (9).

4. High-voltage apparatus according to claim 2, characterized in that the cover (9) is made of lightweight metal, such as aluminum or titanium, or is formed by an alloy which contains aluminum, titanium and/or vanadium.

5. A high-voltage apparatus according to claim 2, wherein said at least one recess further includes at least one second groove (18, 19, 20) extending transversely to the longitudinal axis of the beam and perpendicularly to the first groove (16, 17).

6. High-voltage apparatus according to claim 5, said cover comprising a circular cover (9), wherein the bending spring (12) acts eccentrically on the cover (9).

7. High-voltage apparatus according to claim 5, characterized in that the cover (9) is made of lightweight metal, such as aluminum or titanium, or is formed by an alloy which contains aluminum, titanium and/or vanadium.

8. High-voltage apparatus according to claim 1, characterized in that the cover (9) is made of lightweight metal, such as aluminum or titanium, or is formed by an alloy which contains aluminum, titanium and/or vanadium.

9. A high-voltage apparatus according to claim 1, wherein said cover is a circular cover and wherein a spring force exerted by the bending spring on the circular cover acts eccentrically thereon.

10. A high-voltage apparatus according to claim 9, further including a sleeve (13) constituted of electrically conductive material disposed between said at least one bending spring (12) and said cover (9) and an impression extending from said cover (9) and bulging toward the interior of said casing.

11. High-voltage apparatus according to claim 10, characterized in that the cover (9) is made of lightweight metal, such as aluminum or titanium, or is formed by an alloy which contains aluminum, titanium and/or vanadium.

12. High-voltage apparatus according to claim 9, characterized in that the cover (9) is made of lightweight metal, such as aluminum or titanium, or is formed by an alloy which contains aluminum, titanium and/or vanadium.

* * * * *